United States Patent [19]

Ward

[11] 4,360,290
[45] Nov. 23, 1982

[54] INTERNAL PIPELINE PLUG FOR DEEP SUBSEA PIPE-TO-PIPE PULL-IN CONNECTION OPERATIONS

[75] Inventor: John M. Ward, Katy, Tex.

[73] Assignee: Shell Oil Company, Houston, Tex.

[21] Appl. No.: 217,489

[22] Filed: Dec. 17, 1980

[51] Int. Cl.³ .......................... F16L 1/04; B63B 35/04
[52] U.S. Cl. ...................................... 405/170; 138/89; 405/169
[58] Field of Search ................................ 405/166–173, 405/195, 158; 138/89, 89.4, 96 T, 93, 90; 137/454.2, 1, 802; 166/187, 97, 332, 127, 135, 188, 192

[56] References Cited

U.S. PATENT DOCUMENTS

| 3,746,026 | 7/1973 | Herring | 137/1 |
| 3,943,982 | 3/1976 | LeCordier | 138/89 |
| 3,978,678 | 9/1976 | Duncan et al. | 405/171 |
| 3,978,892 | 9/1976 | Scodino | 405/173 X |
| 4,011,620 | 3/1977 | Southgate | 405/171 X |
| 4,026,329 | 5/1977 | Thompson | 138/89 X |
| 4,077,435 | 3/1978 | Van Scoy | 138/93 |

Primary Examiner—Dennis L. Taylor

[57] ABSTRACT

Pressure-tight pipeline plugs are used in subsea connection operations to achieve a lightweight pipe condition which facilitates alignment by easing handling problems. An internal plug is provided for this purpose which is particularly useful for connection operations using a pipe-to-pipe pull-in technique and is capable of sealing, remotely releasing and then being pumped through the line to a terminus.

12 Claims, 6 Drawing Figures

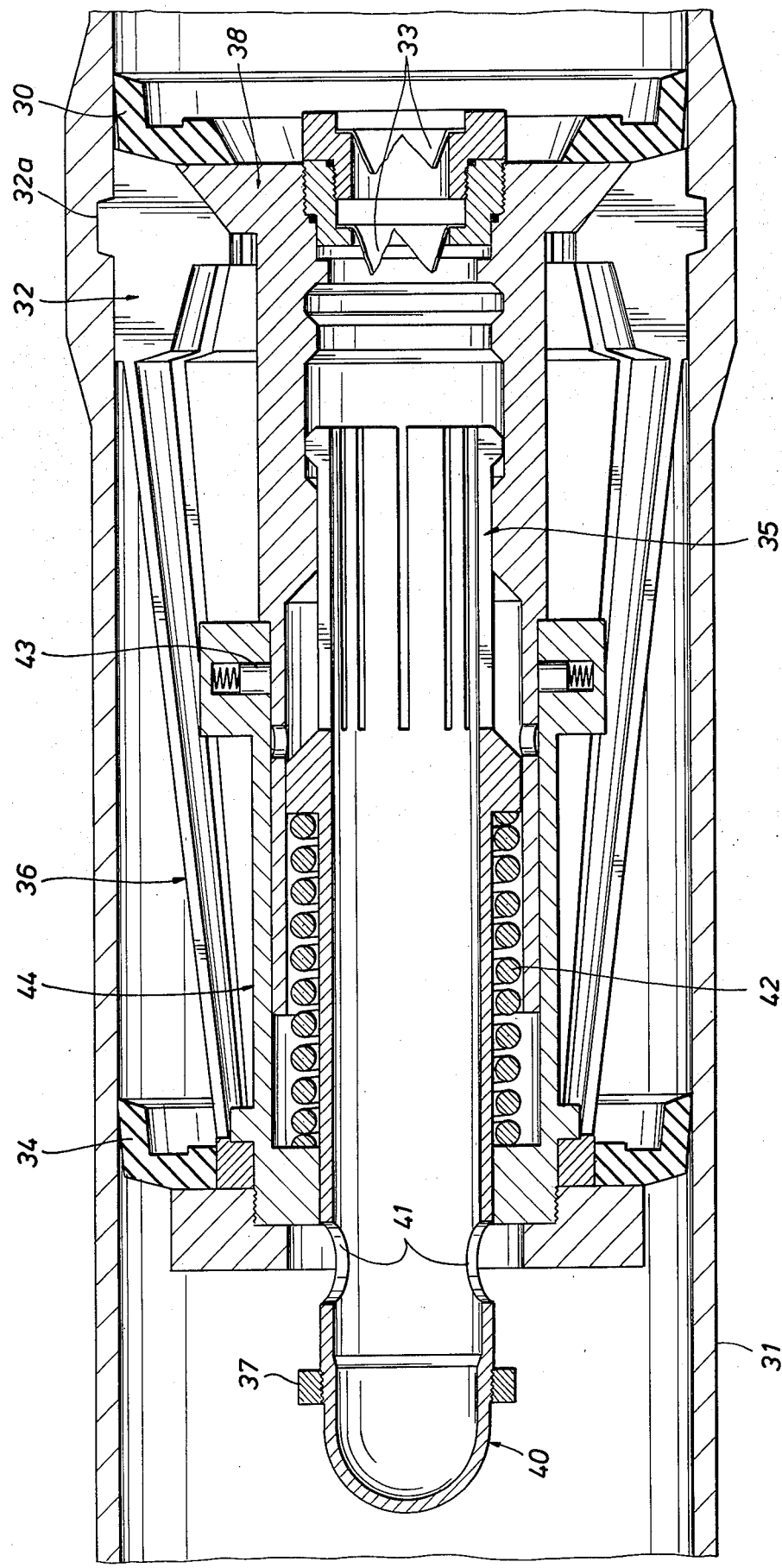

INTERNAL PIPELINE PLUG FOR DEEP SUBSEA PIPE-TO-PIPE PULL-IN CONNECTION OPERATIONS

BACKGROUND OF THE INVENTION

In conventional offshore pipelay operations, plugs are welded onto the pipeline end when the end must be laid on bottom. This can be done as planned or emergency measure, permitting the pipeline to remain dry and light for subsequent recovery of the pipeline end. The welded plug both seals the pipe end to keep out water and provides the means for transferring tension to the pipe during abandonment and recovery. After recovery the welded plug may simply be cut off.

For deepwater pipeline construction operations where subsea connections are required, there is a need for different kinds of plugs. Like welded plugs, such plugs must keep out water to lighten the pipe and ease alignment operations, but the plugs are not necessarily used for pulling, since there may be additional alignment structure at the pipe end which can serve as a pull point. The major different is that once alignment of pipe connectors is achieved, the plugs must be removed on bottom in conjunction with the connection operations rather than being brought to the surface for removal.

Somehow the hydrostatic pressure across the plugs must be equalized, and the plugs safely released just before or after the connectors are joined. It is preferable to perform the plug release and removal operation remotely, that is, without divers, since diving operations in deep water become prohibitive both technically and economically.

From the foregoing, it is clear that welded plugs would be difficult to use in deep subsea connection. Even if the welded plug could be removed on bottom (perhaps explosively), there is then a need in the art for a suitable pipe end configuration for subsequent connection operations.

SUMMARY OF THE INVENTION

Purposes of the present invention include (a) the provision of basic applications of internal pipeline plugs for deep subsea connection operations, (b) the ascertainment of the elements of an internal pipeline plug required for such applications, (c) the defining of general operational requirements in applying internal plugs in basic applications, and (d) the inclusion of steps for inserting plugs during deepwater operations and removing the plugs once the pipe has been laid, and doing so remotely, without divers. The applications of internal plugs of the present invention include assembly of pipe strings on bottom and initiation and termination of pipe lines laid from surface vessels. The plugs can be used as mid-points within a pipe string as well as at submerged pipe ends.

The main distinguishing features of the plug of the present invention is that the plug can be pumped through the pipeline, including large radius elbows. The release mechanism of the plug is entirely mechanical (no batteries, solenoids, gas bottles, etc.) and is actuated simply by pressuring the pipe. The present invention pertains specifically to an internal pipe plug which is contained entirely within the inside diameter of the pipe. No part projects over the pipe end. The plug can be removed from either pipe end if the line has a constant diameter.

Thus, the invention provides an internal plug capable of sealing, releasing and being pumped out of a pipeline including means for sealing a high pressure side of the plug from a low pressure side, means for gripping the pipe wall, pressure release means operable at a set pressure to permit fluid passage, fluid flow control means operable to permit controlled passage of fluid therethrough and, means operable to release the gripping means from the pipe wall when a set pressure relationship of the high pressure side to the low pressure side is attained. Preferably the pressure release means is rupture means breakable at a set pressure to permit fluid passage.

Further, the invention covers a method for laying a pipeline in an at least near neutral buoyancy condition comprising sealing a gas into at least part of a pipe string between a closure on one end of the pipe string and a pressure activatable plug within the pipe string, connecting the pipe string to another pipe end, activating the plug with fluid pressure to permit flooding the pipe string, removing the closure, and passing the plug through and out of the pipe string.

DESCRIPTION OF THE DRAWINGS

FIGS. 3A, 3B and 3C show the plug in its three operative positions.

DISCUSSION OF THE PRIOR ART

Figure 1:
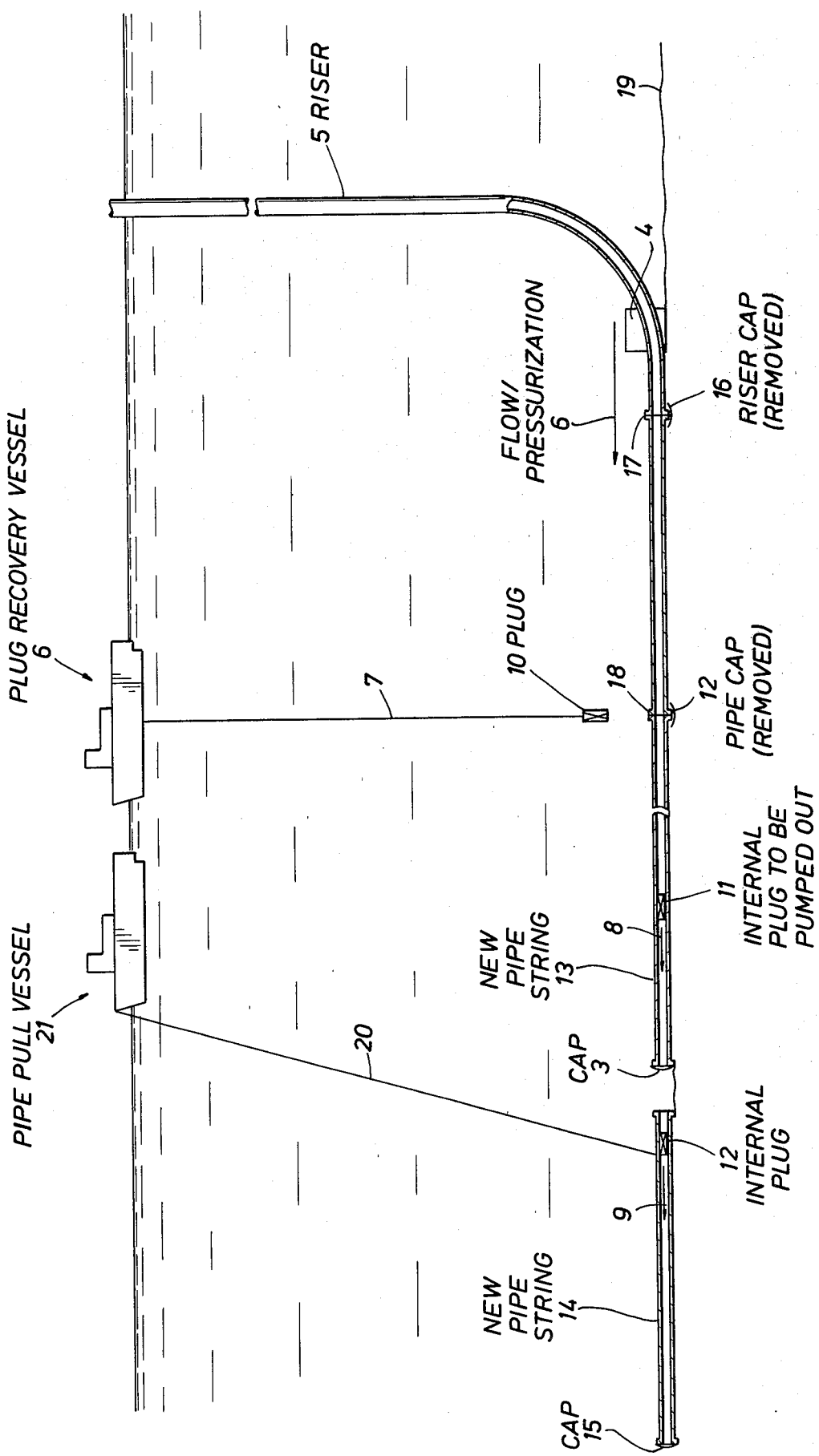
FIG. 1 shows the pipe-to-pipe pull-in connection technique of the invention.

Duncan (U.S. Pat. No. 3,978,678) and LeCordier (U.S. Pat. No. 3,943,982) are similar to each other but have a different use than the plugs of the present invention. Duncan and LeCordier's plugs are pulled through the pipe with a cable and activate (plug and seal) only if a detect or leak is found. Both use friction to hold the plugs in place rather than mechanical interference as do the plugs of the present invention. Neither Duncan nor LeCordier's plugs seems to have the geometry necessary to go through pipe elbows. Herring (U.S. Pat. No. 3,746,026) is closet to the plugs of the present invention; however, the use of the Herring plug is different. The Herring plug moves through the pipe, then stops and seals on command, whereas the plugs of the present invention are initially sealed before lowering to the sea floor. Once released, the plugs of the present invention do not stop to plug the pipe again. Herring's plug also uses batteries to power an electrical release control mechanism. Herring also uses friction to grip the pipe wall rather than mechanical interferences.

Burleson (U.S. Pat. No. 3,577,737), Streigh (U.S. Pat. No. 4,184,515 and U.S. Pat. No. 4,178,967) and Mayfield (U.S. Pat. No. 4,142,371) all show plugs for straight pipe or platform pipes which are pulled out with cable rather than being pumped out. Teague (U.S. Pat. No. 3,537,483) shows a plug for pipe but it too is pulled out with a cable. Britton (U.S. Pat. No. 4,145,158), Coone (U.S. Pat. No. 4,175,592), Knox (U.S. Pat. No. 4,178,112), Bowerman (U.S. Pat. No. 3,533,241) and Mayfield (U.S. Pat. No. 4,024,723) all show various platform leg closures and pipe seals which are not applicable. Arnold (U.S. Pat. No. 3,842,612), Scodino (U.S. Pat. No. 3,978,892), Weaver (U.S. Pat. No. 3,669,153), Lien (U.S. Pat. No. 4,023,699), Flimon (U.S. Pat. No. 4,185,665) and Johnson (U.S. Pat. No.

3,166,124) all show cap type plugs which cannot pass through the pipe. Southgate (U.S. Pat. No. 4,011,620) and Deaver (U.S. Pat. No. 3,942,560) show designs which are not primarily plugs at all.

DESCRIPTION OF PREFERRED EMBODIMENTS

The type of deep subsea pipeline connection operation to be made determines the kind of plug which may be used. Subsea pipeline connection operations which are pertinent to the use of internal plugs can be divided into two cases, the first being on-bottom pipe pull-in operation (initiation or termination). These operations consist of (a) attaching a pull cable between the ends of two pipes previously placed on-bottom, (b) pulling them into alignment and together with an on-bottom cable puller, and (c) connecting and testing the completed joint. In this first case, it is assumed that one end of the pipe to be joined can be pulled across the bottom (as in the bottom tow method) either because the pipe string is short enough or because slack has been generated in one end of the line (for instance by developing a 90° bend during the pipelay operation). This connection method is suitable for either pipe-to-pipe connections or pipe-to-subsea structure connections. The pipe can be placed on bottom by any known pipelay method (e.g., bottom tow, conventional, or J-lay) and the connection can be a "first end" (initiation) or "second end" (termination) of the pipeline.

The second case involves pipe hinge-down operations (initiation only). This entails (a) lowering a pipeline end from a surface vessel, (b) engaging eccentric hinge valves by vertical stab-in procedures, and (c) adding pipe from the surface, lay the pipe string over, converting to a J-lay method, but at the same time engaging the connector ends by way of the hinge-over action. If it is not possible to vertically stab the pipe either because there is an interfering surface obstruction or because initiation is desired as part of a conventional pipelay operation (as opposed to J-pipe-laying), a cable can be established and the pipe end can be pulled in laterally as a part of the lowering-down procedure, creating a catenary like a small scope mooring line configuration. These hinge-down methods are preferably used in initiating a pipeline at an on-bottom structure, but can also be used to lay-away from an existing pipeline end.

FIG. 1 shows how internal plugs 10, 11 and 12 caps 2, 3 and 15 can be used together to form a plug system for a pipe-to-pipe connection operation. The pipe caps can be "blown off" by pressure in the pipe greater than hydrostatic (filling the other pipe end with water) before the connection is made. The internal plugs 10, 11 and 12 can be released by similar overpressure, then pumped out, and this can be done after the connection operation. Since the greatest risk associated with using an internal plug is getting it stuck, it is preferred to (a) keep the pipe interior clean and free from construction junk and (b) minimize the distance of travel of the plug for recovery, once released. Thus two types of internal plugs are possible: one pumpable away from the connector and one pumpable through the connector. This invention is particularly concerned with the former case, although it can be used in the latter case as well.

FIG. 1 shows a pipe-to-pipe pull-in connection wherein internal plugs 11 and 12 are to be pumped out in the direction of arrows 8 and 9. Pumped out plug 10 is recovered via line 7 by vessel 6. Flow/pressurization is in the direction of arrow 6, and the end of the finished pipeline is at riser 5 held in position by block 4. New pipe strings 13 and 14 are added as cap 2 is removed first, then cap 3 and then cap 15, and so on. Riser cap 16 is removed prior to making connection 17 and pipe cap 2 is removed prior to making connection 18, and the caps lay on sea floor 19. New pipe string 14 is pulled into proximate position via line 20 by pipe pull vessel 21. On-bottom pull cables for final alignment of the pipe ends are not shown.

Although plugs are typically used at the submerged ends of pipe to keep the entire line light, there are applications where it is advantageous to place plugs at a point away from a pipe string end. Mid-string plugs allow selected sections of pipe to be flooded without flooding the entire string. By flooding only a section of pipe, the pipe's own weight is used to anchor that section to the seafloor while allowing the rest of the pipe to remain light and relatively easy to move. This technique is particularly useful in pipe terminations at a structure. The line is laid past the structure, then flooded up to the point where the curve into the structure is to begin. Having anchored the main body of pipe, the light end is pulled into the structure to complete the termination.

Internal plugs such as in the present invention are particularly useful at the leading end of horizontal pull-in initiations and terminations as shown in FIG. 1. The plug remains in place until after the connector is joined and tested, then preferably is pumped out away from the connection. When assembling a number of bottom-towed strings, the internal plug may be pumped out the trailing end of each string before the next section is connected. However, the plug can be pumped out in either direction once the pipeline is complete.

Internal plugs are most desirable from a convenience-of-construction point of view. Such plugs may be placed within the connector bore or in a special spool piece welded into the pipe string. There are no external projections to interfere with a lay-barge tensioner (not shown) or stinger (not shown). Such plugs can be recovered and reused to lower construction costs. Since internal plugs allow the connector to be joined prior to flooding, the new pipe may be flooded with clean water through the existing pipe rather than slit-laden water from the sea floor. Once construction is complete, the plug is completely removed from the line leaving behind no hindrances to operations.

Operational requirements for such plugs include the following: (1) plugs must seal against hydrostatic pressure. Pressure inside the pipe will generally be one atmosphere while pressure outside the pipe in, for example, 2000 feet of water will be 61 atmospheres or about 904 psi. Also, (2) plugs must resist axial loads due to hydrostatic pressure. The 889 psi pressure differential across the plug will produce an axial force of 350,000 pounds in a 22.4 inch inside diameter pipe. In addition, (3) plugs must withstand the stresses and strains imposed by the pipe-laying process, and be removable without divers when the pipe is in its final position. Finally, (4) plugs must leave no obstruction in the pipe which could prevent passage of pigs or spheres in operation. The present invention meets each of these requirements.

Preferred features for plugs include the following: (1) plugs should allow easy pressure testing before installation, and allow the connector to be pressure tested in place. The latter implies that the plug should withstand pressures much higher than hydrostatic. For example, test pressure for a 24-inch connector is on the order of 3200 psi. Also, (2) plugs should be reusable with minor refurbishing. This is primarily important where many bottom-towed strings are being assembled together in a long line. Finally, (39 plugs should be lightweight and be low cost. The plug of the present invention has all of these preferred features.

Four basic elements are provided by the plug of this invention: a seal, a grip, a release mechanism, and pressure equalization mechanism. Seals prevent water from entering the pipe. Elastomeric seals can be used since the seals are temporary and are not exposed to hydrocarbons. Grips hold the plug in place against the tremendous axial loads generated by the pressure differential across the plug. They transfer this load from the plug to the pipe. Because of the magnitude of the loads in deep water, the grips rely on mechanical interference rather than unpredictable adhesion or friction for load transfer. In the internal plug of this invention the grip may be teeth which engage a machined groove in the pipe wall.

A fourth element of the plug of this invention, a pressure equalization mechanism, is required since the pipe is flooded through the plug. This mechanism is essentially a controlled leak path which can be opened at will. Equalizing the pressure across the plug eliminates the hydrostatic load on the grip which the release mechanism must overcome. In such an internal plug, pressure equalization is necessary to prevent the plug from shooting down the pipe when released. A controlled release of the plug is desired.

A preferred way to activate the pressure equalization mechanism in the internal plug is the use of previously laid pipe as a signal conduit. Pressure above the connector test pressure causes a relief valve, rupture disk, or propagating buckle tube to open, allowing water into the newly laid pipe. Once pressure has been equalized across the plug, its release mechanism disengages the plug. In the internal plug of this invention, the grip is retracted from the pipe wall to eliminate the mechanical interference holding the plug in place. It is critical that the release mechanism lock in the released configurated so that the line cannot become accidentally plugged at a later time.

The fact that the internal plug of this invention is capable of being pumped through the pipe places constraints on its design and the design of the pipeline. Most of these constraints are to ensure that the geometry of the pipe and the plug cannot interact to form a mechanical interference. It is imperative that the plug not get stuck in the pipe. In essence, the plug has a geometry similar to a pipeline pig once it has been released from the pipe wall. The main obstacles it must overcome in its journey down the pipe are pipe deformations, such as ovality and dents, bends, and construction debris.

The geometry of the plug of this invention allows for a pipe inside diameter constriction on the order of about 4% of the nominal pipe diameter to account for manufacturing tolerances of outside diameter, wall thickness, and ovality, and other deformations such as dents incurred during laying. For example, a plug for 24-inch pipe with 0.8-inch wall thickness should have no metal or other rigid material within one inch of the nominal pipe wall. Of course, the exact tolerance required depends on the pipe being used. Each pipe joint should be checked with a caliper disk before installation to ensure sufficient clearance for the plug to pass.

Figure 2:
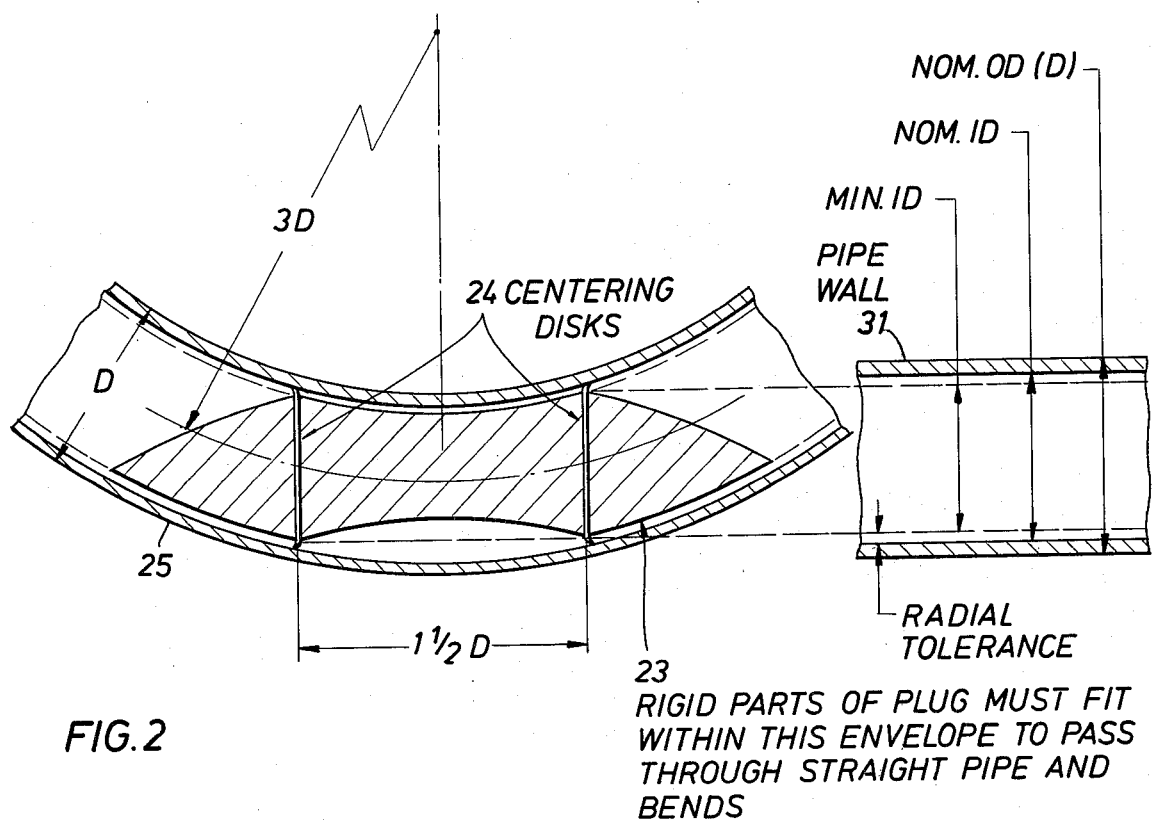
FIG. 2 depicts the geometric envelope for the plug.
Figure 4:
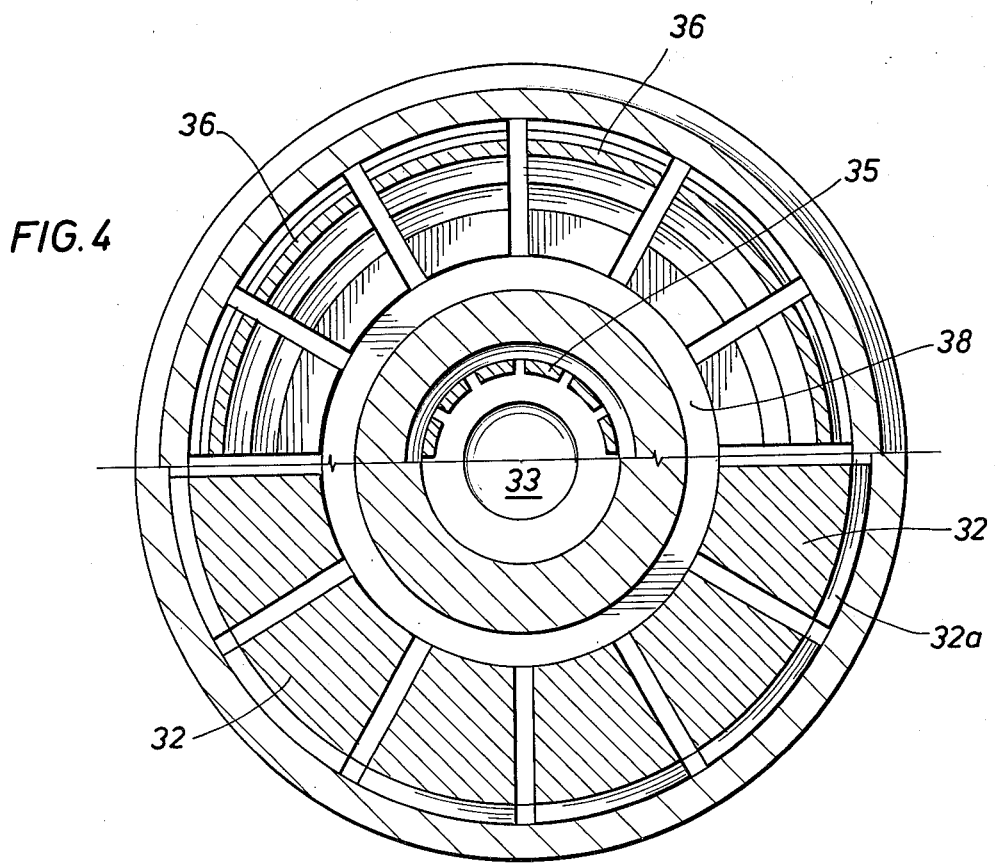
FIG. 4 is a cross sectional view of the invention as shown in FIG. 3A.

Pipe bends place an additional geometrical constraint on the internal plug of this invention. FIG. 2 shows the envelope 23 in which the plug must fit to traverse a bend. Manufacturing tolerances must be accounted for as shown. The plugs have a length of about $1\frac{1}{2}$ times the nominal outside diameter between flexible centering disks 24. This requires that the pipeline 25 have no bends sharper than about 3R (bend radius R=3× nominal pipe diameter).

Pipeline installation procedures are planned to minimize the danger of getting the plugs stuck on construction debris such as welding rods and slag. Bottom-towed strings are cleaned and checked with a caliper pig onshore before sealing the ends. During installation, the plugs are pumped the shortest distance possible to prevent accumulations of debris in front of them. In bottom-towed lines, the plugs are pumped out after each string is connected rather than after the line is complete. Flooding the pipe 25 with clean water is more desirable than using silty sea floor water, since accumulations of slit can impede the progress of the plug.

Figure 3A:
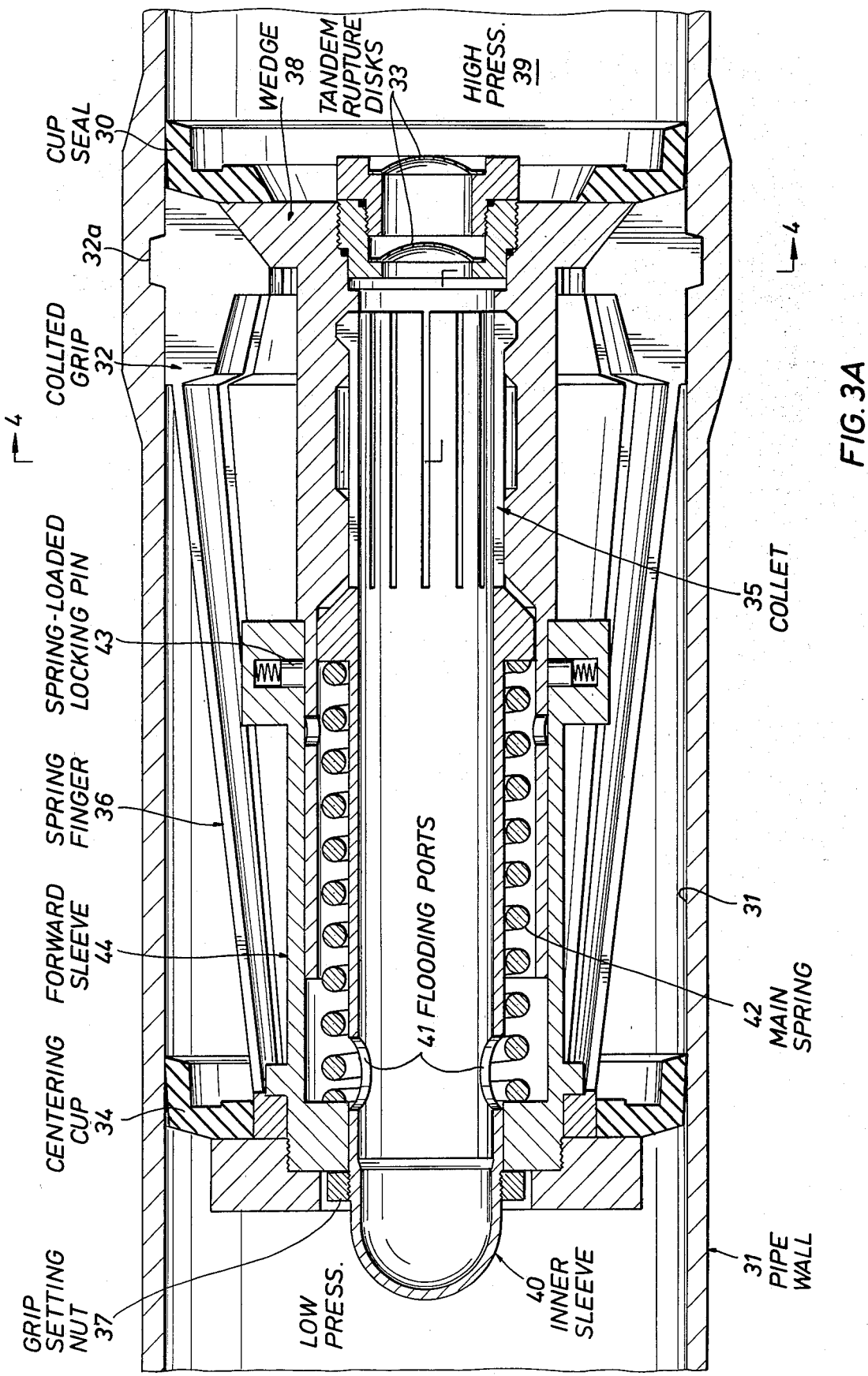
Figure 3C:
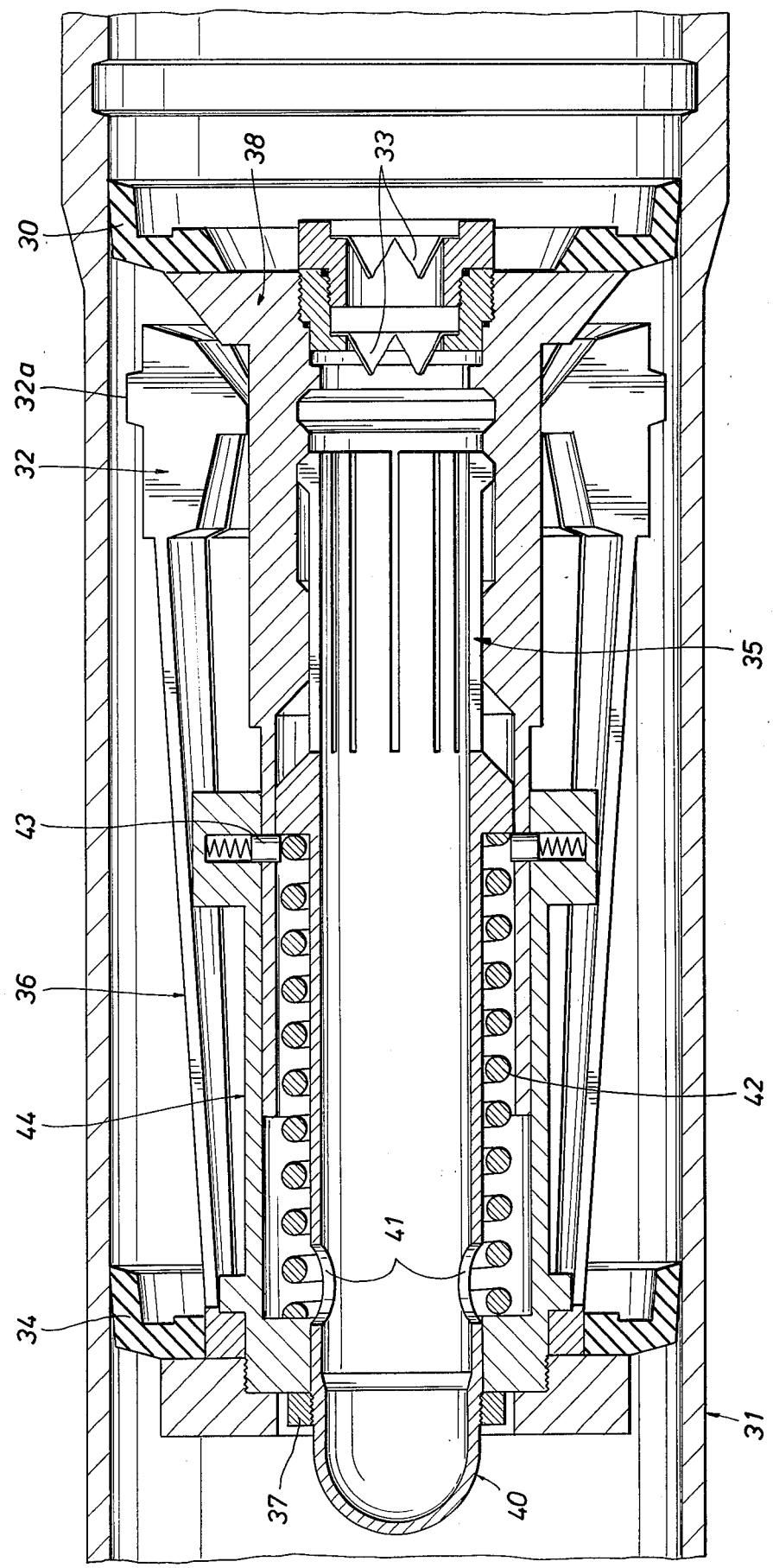

The features of the internal plug with integral pressure equalization mechanism are shown in FIGS. 3A, 3B and 3C. In FIG. 3A the plug is locked into the pipe wall in the plug configuration. In FIG. 3B the plug is in a flooding condition. In FIG. 3C the plug is in the pigging configuration.

The seal 30 in the internal plug presses tightly against the pipe wall 31. It also is retractable or flexible enough to accommodate irregularities in the pipe wall as the plug is pumped out. Since the seal is temporary, elastomers may be used. A pressure-activated seal is preferred. However, the seal also has some elastic activation to provide an initial seal before the pipe is lowered subsea enough to develop a pressure differential.

The colleted grip 22 in the internal plug provides a mechanical interference between plug and pipe to transfer hydrostatic loads to the pipe. The grip also retracts into the "pigging" envelope in FIG. 2 before the plug can be removed. It is preferred to have a pressure-activated grip, but the grip must be able to be set securely while at the surface before being lowered to the sea floor.

The pressure equalization mechanism 33 is sized to provide a reasonably high flow rate. For example, a 4-inch diameter flow path in a 24-inch pipe in 2000 feet of water will allow the pipe to fill at 4 to 5 miles per hour under hydrostatic pressure alone.

The release mechanism changes the plug geometry so that it fits within the pigging envelope shown in FIG. 2. The grip 32 retracts from the pipe wall. The seal 30 is flexible so it does not have to be retracted. The release mechanism ensures that the pigging geometry is locked in so that the grip 32 cannot grab the pipe somewhere downstream.

In the pigging configuration rigid parts of the plug fit within the envelope of FIG. 2. The centering cups 34 are flexible and are spaced approximately $1\frac{1}{2}$ D apart.

A simple elastomeric cup seal such as seal 30 is used which doubles as a centering cup 34 during the removal operation. The seal 30 is initially seal by a slight radial compression as it is inserted into the pipe. It becomes pressure-activated as hydrostatic pressure increases. By using the grip 32 as a back-up, the seal cross-section is made thin enough to provide the flexibility required in the pigging configuration yet withstand the tremendous axial forces during plugging.

The grip 32 is a colleted ring of steel teeth which engage a groove 32a in the pipe wall 31 to provide the mechanical interference required to hold the plug in place. The grip 32 is pressure-activated and is designed to provide a direct load path from wedge sleeve 38 and seal 30 to the pipe wall. Thus, the forward parts of the plug including the spring fingers 36 carry no load in the plug configuration. The grip 32 is set initially by tightening the grip setting nut 37 which pulls the wedge 38 into the grip 32. When released, the spring-fingers 36 retract the grip 32 into the pigging configuration.

Pressure equalization is accomplished by pumping up the high pressure side 39 of the plug until the rupture disks 33 break. High pressure water forces the inner sleeve 40 to slide forward exposing the two flooding ports 41. At the same time the main spring 42 is compressed to its full extent. When the downsteam pipe is nearly full, the pressure difference across the plug drops, the spring 42 begins to overcome the pressure force, and the inner sleeve 40 slowly slides back, eventually closing off the flooding ports 41.

Rupture disks 33 having thin metal centers are very reliable devices and well known in the art. Typically, they break at +5% of their set pressure. Reverse buckling types may be tested to within 90% of the set pressure to ensure reliable operation. FIG. 3 shows the rupture disks mounted in tandem for redundancy but other configurations may be used. For example, the four-inch-diameter disks shown in this design for 24-inch pipe will provide a flow rate of about 10,000 GPM at 900 psi for a fill velocity of 4-5 miles per hour.

The release mechanism uses the stored elastic energy in the main spring 42 and spring fingers 36 to bring the plug into the pigging configuration. When pressure equalization is nearly complete, the main spring 42 forces the inner sleeve 40 to slide back. Colleted teeth 35 on the end of the inner sleeve 40 engage a stop in the wedge 38 so that the spring 42 also pushes the wedge 38 back. At this point in the sequence, pressure equalization is essentially complete; the grip 32 and seal 30 are no longer pressure-activated. As the wedge moves back, the spring fingers 36 retract the grip 32 and hold it away from the pipe wall 31. When the spring 42 has expanded to its full length, spring-loaded pins 43 engage holes in the forward sleeve 44, inner sleeve 40, and wedge 38, locking them in the pigging configuration. After removal the plug may be rebuilt and used again by replacing the rupture disks 33 and cup seals 30.

Thus, the release mechanism is entirely mechanical. Reliable actuation is accomplished by a mechanical spring rather than by hydraulic or pneumatic devices with their attendant seals. The mechanism consists of three concentric cylinders which slide within one another. No. rotational motions or complicated links are used. The relative simplicity of the sliding cylinder mechanism enhances the reliability of the plug.

What is claimed is:

1. An internal pipeline capable of sealing, releasing and being pumped out of a pipeline comprising, means for sealing a high pressure side of the plug from a low pressure side, means for gripping the pipe wall, pressure release means operable at a set pressure to permit fluid passage, fluid flow control means operable to permit controlled passage of fluid therethrough and, means operable to release the gripping means from the pipe wall when a set pressure relationship of the high pressure side to the low pressure side is attained.

2. The plug of claim 1 wherein the sealing means is an elastomeric cup seal.

3. The plug of claim 1 wherein the gripping means is colleted.

4. The plug of claim 1 wherein the pressure release means is at least one rupture disk.

5. The plug of claim 1 wherein the pressure release means is a relief valve.

6. The plug of claim 1 wherein the pressure release means is a propagating buckle tube.

7. The plug of claim 1 wherein the fluid flow control means is a spring loaded sleeve, axially movable to open flooding ports for the passage of fluid to relieve a high pressure imbalance, and upon achieving a lesser pressure imbalance, axially movable to release the gripping means.

8. The plug of claim 5 including spring loaded locking pins for locking the fluid flow control means into a fixed position relative to the gripping means.

9. A method for laying a pipeline in an at least near neutral buoyancy condition comprising sealing a gas into at least part of a pipe string between a closure on one end of the pipe string and a pressure activatable plug within the pipe string, connecting the pipe string to another pipe end, activating the plug with fluid pressure to permit flooding the pipe string through the plug, removing the closure, and passing the plug through and out of the pipe string.

10. The method of claim 9 when the plug grips the wall of the pipe string until a lesser pressure imbalance is achieved on both sides of the plug following activation of the plug.

11. The method of claim 10 wherein the plug is ruptured by breaking a rupturable disk.

12. The method of claim 9 wherein the plug is recovered and re-used.

* * * * *